Dec. 3, 1935.　　　　　R. S. MARTIN　　　　　2,023,141
EXTENSION HANDLE FOR CONTROL LEVERS
Filed April 9, 1935
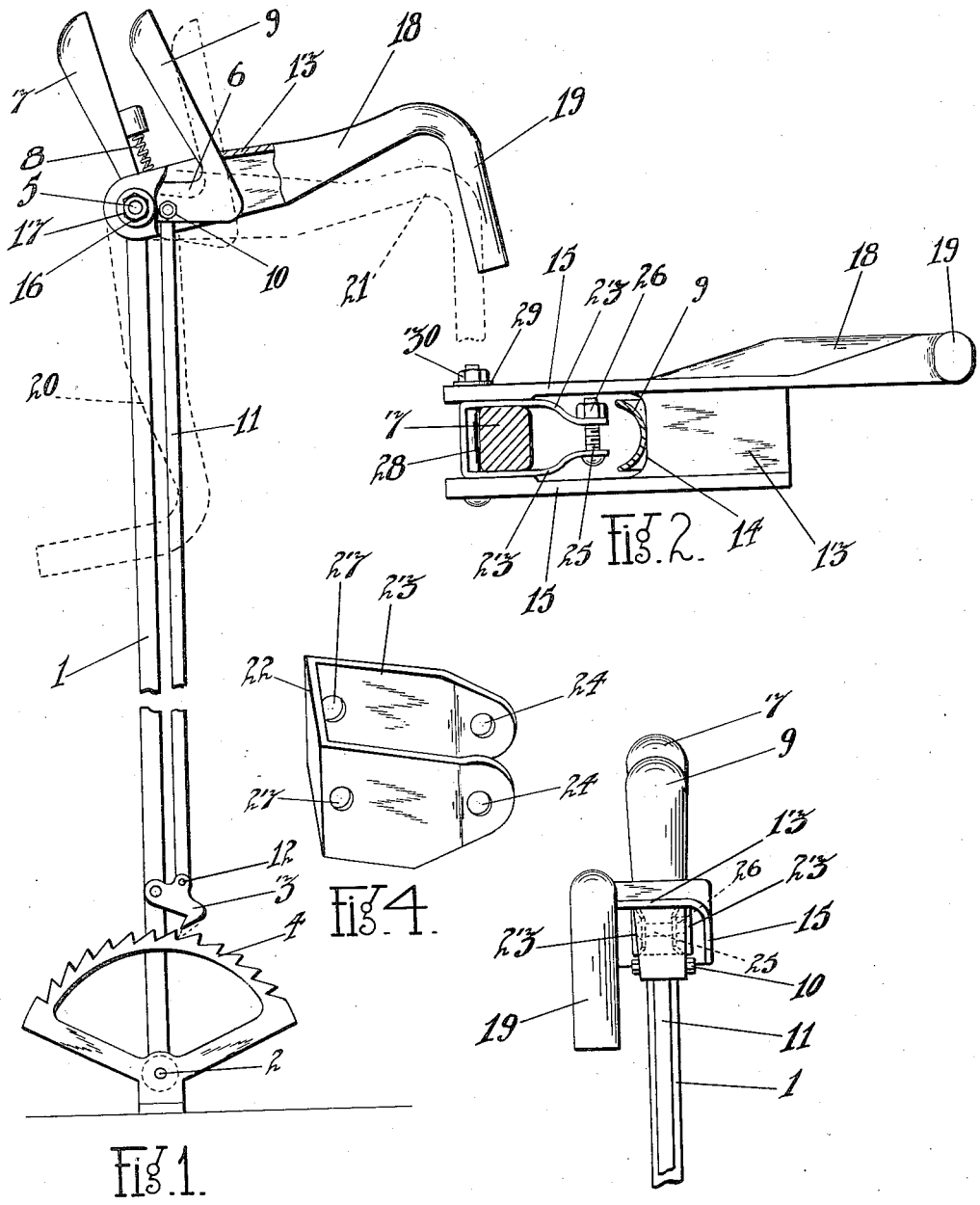
INVENTOR.
RUSSELL S. MARTIN.
BY
ATTORNEY.

Patented Dec. 3, 1935

2,023,141

UNITED STATES PATENT OFFICE 2,023,141

EXTENSION HANDLE FOR CONTROL LEVERS

Russell S. Martin, Binghamton, N. Y.

Application April 9, 1935, Serial No. 15,415

6 Claims. (Cl. 74—479)

My invention relates to improvements in extension handles for control levers and constitutes a simplified improvement over that of my prior U. S. Letters Patent No. 1,588,325, issued June 8, 1926.

The principal object of my invention lies in the provision of an extension handle which may be easily and readily applied to the standard conventional type of operating lever and has particular adaptation for use with the emergency brake levers provided on automobiles.

In present day automobile construction, the emergency brake levers are for the most part positioned well under the dashboard of the car and out of the normal easy reach of the driver, necessitating his shifting his position to an awkward unblanced one in order to reach the lever for operation. In an emergency this makes an awkward arrangement as well as a hazardous one. It is the purpose of my invention to provide an extension handle for this type of lever by means of which the operation of the emergency brake lever can be accomplished by the driver without substantially changing his position and enabling him to operate the lever with a maximum amount of ease with a normal movement.

One important feature of my invention lies in the provision of such an extension handle which may be readily attached to most levers by utilizing the standard normal equipment only and eliminating the necessity for special modification of the lever and its parts.

I have also provided as a part of my invention a simple inexpensive and easily operated attachment whereby the extension handle may be readily adapted and applied to such levers as do not lend themselves to the mounting of the extension handle upon the standard parts provided.

Another feature of my invention lies in the provision of an extension handle which may be readily folded downwardly out of the way for the convenient shifting of the driver or passenger in the front seat of the automobile and which may then be easily and quickly restored to its normal operating position.

Still another object of my invention lies in the provision of an extension handle which when grasped and pulled upon with the normal upward pull of the operator, serves to automatically release the latch for the lever, making it unnecessary for the operator to perform this operation in the usual manner.

Other objects and advantages in details of construction will be apparent as the description proceeds, reference now being had to the figures of the accompanying drawing, forming a part of this application, and wherein like reference numerals indicate like parts.

In the drawing:

Figure 1 is a side view of the brake lever of an automobile or the like with my invention applied thereto and showing the parts in a position to illustrate the release of the lever latch. The extension handle is shown in dotted lines in its normal position and in its folded "out of the way" position.

Figure 2 is a detail bottom plan view of my extension handle shown in position on the brake lever and illustrating also the attachment provided for use in certain cases.

Figure 3 is a detail rear view of my invention applied to the brake lever.

Figure 4 is a detail perspective view of the clamp attachment.

While I have shown and will describe my invention as applied to the conventional brake lever for automobiles, it will be understood that the same is applicable to levers used for other controlling purposes as well.

The reference character 1 refers to the brake lever pivoted as at 2 and carrying adjacent its pivoted end a latch pawl 3 adapted to cooperate with the toothed rack or segment 4 whereby the lever may be latched in any position of pivotal adjustment. The connection between the brake lever 1 and the brakes or other devices in connection with which it is used, has not been shown as it forms no part of this invention and may be of any conventional construction.

Adjacent the upper end of the lever 1 there is provided a pintle 5 to which is pivoted one end of a bell crank lever 6. The extreme upper end of the lever 1, above the pintle 5, constitutes a hand grip portion 7 generally inclined slightly and suitably secured to this hand grip portion is one end of a spring 8, the opposite end of which bears upon the pivoted end of the bell crank lever 6 whereby to normally urge it downwardly. The opposite end of the bell crank lever 6 is formed as a hand gripping extension 9 lying adjacent the hand grip portion 7 of the lever. Pivotally secured to the bell crank 6 as at 10 is one end of a latch roll 11, the lower end of which is pivotally secured as at 12 to the latch pawl 3.

Obviously the normal position of these parts finds the bell crank 6 under the tension of the spring 8 in its lowermost position in which the rod 11 and latch pawl 3 are moved downwardly with the pawl in locking engagement with the toothed rack 4. When it is desired to release the latch to permit movement of the brake lever 1 to the left in Figure 1, the operator normally grasps the hand grip portions 7 and 9 in his hand and by pressing inwardly upon the portion 9 rocks the bell crank on its pivot and lifts the latch rod and latch pawl upwardly out of tooth engaging position whereupon the lever may be freely pivoted and moved to the desired position. The parts just described are conventional and well known in the art.

My improved extension handle consists of a channel shaped member 13 the top or closed side of which is cut away as at 14 for a substantial portion of its length to provide the parallel side arms 15 spaced apart an amount to permit of receiving the upper end of the lever 1 and the bell crank 6 between them. The ends of the sides 15 are provided with suitable openings adapted for alignment with the pivot point 5 on the brake lever 1 and adapted to receive the pintle 5 which passes therethrough. In most cases, the standard construction of these brake levers is such that the pintle 5 may be removed and the extension handle placed in position with these openings aligned with this pivot point and the pintle 5 placed back in position passing through the side arms 15 of the extension handle as well as through the lever 1 and the end of the bell crank 6. If the pintle 5 is not long enough to accommodate the extra width provided by the thickness of the side arms 15 of the extension handle, a longer pintle pin may be substituted therefor. This pintle 5 thus becomes the pivot point for both the bell crank 6 and the extension handle 13. A spring washer 16 may be provided between the nut 17 on one end of the pintle and the adjacent side arm 15 whereby the tension on the side arms may be adjusted. Preferably this tension is adjusted to the point where the extension handle may be rocked upon the pintle 5 to any desired position and retained in such position frictionally.

One side of the extension handle is provided at the end opposite from the pintle 5 with an extension 18 which may be of any desired length and form, and which terminates in a conventional hand grip portion 19. The length of the extension 18 should be such as to bring the hand grip 19 into position for easy reach and grasp of the operator.

It will be noted particularly with reference to Figures 2 and 3, that the extension portion 18 and the hand grip 19 are offset from the body of the extension handle 13 whereby the same may be pivoted downwardly as at 20 in Figure 1 where the same is out of the way when the occasion arises. In the dotted line position 21 the extension handle is shown in its normal position with the edge of the cutaway portion 14 of the top of the handle just free of engagement with the hand grip portion 9 of the bell crank release lever and with the latch pawl 3 engaged in locking position. In full lines in Figure 1, the extension lever is shown in its releasing position, namely, lifted up slightly, and in which position the edge 14 of the cutaway portion engages the hand grip 9 rocking the same on the pintle 5 against the tension of the spring 8 and raising upwardly on the rod 11 and latch 3 to disengage the latter from the rack 4.

Assuming the brake lever to have been pulled rearwardly to braking position by the operator and it being desired to release the brake and pivot and lever 1 forwardly, the operator merely grips the hand grip 19 of the extension handle and lifts upwardly thereon in a perfectly normal easy movement resulting in rocking the bell crank upwardly on its pivot 9 and releasing the latch 3. The lever 1 is then free to be moved forwardly by pushing upon the extension handle. When it is desired to apply the brake and rock the lever 1 to the right in Figure 1, the operator again grips the hand grip 19 of the extension handle and with a normal rearward pull, the lever is pulled to the desired braking position whereupon the operator simply releases the handle, this operation being the same as with the ordinary handle.

The extension handle is preferably made in one piece such as by die casting or stamping and in this form requires no extraneous attachments or modifications of the ordinary brake lever mechanism other than possibly a longer pintle pin 5.

In some instances of construction, however, the point at which the pivot pintle 5 passes through the lever 1 may be of an odd shape or size so as not to readily receive the ends of the side arms 15 of the extension handle and therefore, making the pintle 5 unavailable as a pivot for the extension handle. In such cases, I have provided a simple attachment by which the extension handle may be mounted upon and pivoted to the hand grip portion 7 of the lever 1 at a point just above the pintle 5. This extension is shown clearly in Figures 2 and 4 and in dotted lines in Figure 3. The attachment consists of a substantially U-shaped clamp member 22, the side arms 23 of which are provided at their free ends with openings 24 to receive a clamping screw 25. A lock nut 26 is provided for the end of the screw whereby to tightly clamp the arms 23 against the sides of the hand grip extension 7 of the rod 1. The side arms 23 of the clamp are preferably resilient in nature to permit this clamping action.

At a point adjacent the closed side of the clamp 22 the side arms 23 are provided with aligned openings 27 adapted to receive a pintle 28 adapted to extend through the openings provided in the ends of the side arms 15 of the extension handle and through the openings 27 of the clamp 22 whereby to provide a pivot for the extension handle as shown clearly in Figure 2. A spring washer 29 and lock nut 30 are provided for one end of the pintle 28 whereby the tension thereof upon the arms 15 of the extension handle may be adjusted.

The operation of the device with this clamp attachment is identical with that previously described as is obvious from Figure 2.

Thus, if the standard pintle 5 of the brake lever is not useable for the extension handle, the same may be rigidly secured to the hand grip portion 7 thereof and pivoted in the same manner as previously explained.

Of course, changes may be made in details of construction and arrangement of parts without departing from the spirit and scope of my invention. I do not limit myself, therefore, to the exact form herein shown and described other than by the appended claims.

I claim:

1. In combination with a lever, a latch associated therewith for retaining the lever in adjusted positions, a hand grip release member pivoted to said lever and a rod connecting said latch and said release member, an extension handle pivoted to said lever and having an open portion through which said release member extends, and means on said handle engageable with said release member upon upward pivotal movement only of said handle for rocking said release member and releasing said latch.

2. In combination with a lever, a latch associated therewith for retaining the lever in adjusted positions, a hand grip release member pivoted to said lever and a rod connecting said latch and said release member, an extension handle pivoted to said lever and having an open portion through which said release member extends, and means on said handle engageable with said release member upon upward pivotal movement only of said handle for rocking said release member and releasing said latch, said handle being freely movable on its pivot downwardly out of engagement with and independent of said release member.

3. In combination with a lever, a latch associated therewith for retaining the lever in adjusted positions, a hand grip release member pivoted to said lever and a rod connecting said latch and said release member, an extension handle comprising a channel shaped member cut away at one end to provide a bifurcated portion through which said release member freely extends, said bifurcated portion being pivoted to said lever, and means comprising the edge of the cutaway portion of said handle engageable with said release member upon upward pivotal movement of said handle for releasing said latch.

4. In combination with a lever, a latch associated therewith for retaining the lever in adjusted positions, a hand grip release member pivoted to said lever and a rod connecting said latch and said release member, an extension handle comprising a channel shaped member cut away at one end to provide a bifurcated portion through which said release member freely extends, said bifurcated portion being pivoted to said lever, and means comprising the edge of the cutaway portion of said handle engageable with said release member upon upward pivotal movement of said handle for relasing said latch, the opposite end of said handle being offset from said channel shaped portion whereby the handle may be rocked downwardly on its pivot independently of said release member and rod.

5. In combination with a lever, a latch associated therewith for retaining the lever in adjusted positions, a hand grip release member pivoted to said lever and a rod connecting said release member and said latch, a clamp releasably secured to said lever, an extension handle pivoted to said clamp and having an open portion through which said release member extends, and means on said handle engageable with said release member upon upward pivotal movement only of said handle for rocking said release member and releasing said latch.

6. In combination with a lever, a latch associated therewith for retaining the lever in adjusted positions, a hand grip release member pivoted to said lever and a rod connecting said release member and said latch, a clamp releasably secured to said lever, an extension handle pivoted to said clamp and having an open portion through which said release member extends, and means on said handle engageable with said release member upon upward pivotal movement only of said handle for rocking said release member and releasing said latch, said clamp being positioned in said open portion of said handle and between said release member and said lever.

RUSSELL S. MARTIN.